United States Patent [19]

Maiocco

[11] 4,328,688
[45] May 11, 1982

[54] ANTITHEFT DEVICE FOR MOTOR VEHICLES

[75] Inventor: Guiseppe Maiocco, Rivoli, Italy

[73] Assignee: Arman S.p.A., Druento, Italy

[21] Appl. No.: 113,754

[22] Filed: Jan. 21, 1980

[30] Foreign Application Priority Data

Feb. 13, 1979 [IT] Italy .................... 67314 A/79

[51] Int. Cl.³ .................................... B60R 25/02
[52] U.S. Cl. ................................. 70/252; 70/186
[58] Field of Search ........................ 70/252, 186

[56] References Cited

U.S. PATENT DOCUMENTS

| | | |
|---|---|---|
| 2,063,088 | 12/1936 | Fitzgerald . |
| 3,527,071 | 9/1970 | Warnod ................ 70/252 |
| 3,566,635 | 3/1971 | Wolter ................. 70/252 |
| 3,748,877 | 7/1973 | Wolter ............... 70/252 X |
| 3,840,714 | 10/1974 | Arman ............... 70/252 X |
| 3,859,828 | 1/1975 | Ibuka et al. ........... 70/252 |
| 3,863,473 | 2/1975 | Neale .................. 70/186 |
| 3,959,996 | 6/1976 | Thirion ............. 70/252 X |

FOREIGN PATENT DOCUMENTS

| | | |
|---|---|---|
| 923322 | 3/1973 | Canada ..................... 70/252 |
| 1800882 | 7/1970 | Fed. Rep. of Germany ........ 70/252 |
| 2047702 | 3/1972 | Fed. Rep. of Germany ........ 70/252 |
| 2613208 | 10/1977 | Fed. Rep. of Germany ........ 70/252 |

Primary Examiner—Francis K. Zugel
Assistant Examiner—Carl F. Pietruszka
Attorney, Agent, or Firm—John C. Purdue

[57] ABSTRACT

An antitheft device is provided for use with a reversible type key. The device includes a plate movable in a slot extending transverse to the direction of a key-receiving slot. The key entering the slot moves the plate which, in turn, pivots a lever to latch with the lock to prevent the antitheft device from becoming operative as long as the key is in the key-receiving slot. The plate has a guiding surface which rides in a plane surface on the key as the key is inserted. The plane surface on the key moves the plate and lever to the desired position.

3 Claims, 5 Drawing Figures

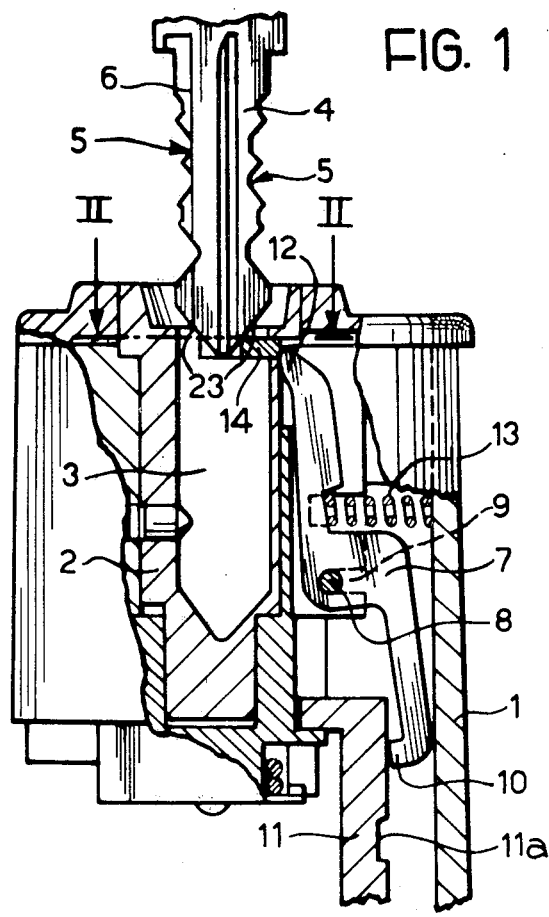
FIG. 1
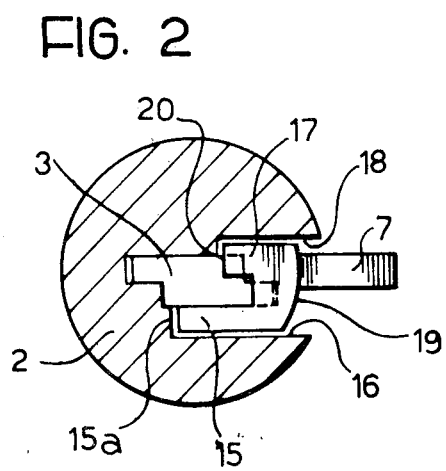
FIG. 2
FIG. 3

ANTITHEFT DEVICE FOR MOTOR VEHICLES

BACKGROUND OF THE INVENTION

1. Field of the Invention

This invention relates to an antitheft device and more particularly to an antitheft device that may be operated with a reversible type key.

2. Description of the Prior Art

The present invention relates to antitheft devices for motor vehicles wherein the steering column is locked by means of a latch which is pushed into the steering column locking position by a drawback spring and wherein said latch is prevented from accidentally moving into said same position by a retaining device comprising a rocking lever provided at its two end portions with two projections, one of these projections sliding on said latch and, in the unlocked position of the latch, being positioned in a recess of said latch, the other of said projections being a spring-loaded finger or feeler which detects the presence of the ignition key in the key slot of the locking device.

An antitheft device of this type is disclosed in German Pat. No. 1,480,411 in the name of Josef Voss KG. In the German patent, the feeler of the rocking lever projects into the key slot of the locking device and slides along the back side of the key, i.e. the side opposite to the teeth of the key. The disadvantage of this known antitheft is the fact that it is not possible to use reversible keys which may be inserted into the key slot of the locking device without first choosing the correct orientation of the key.

SUMMARY OF THE INVENTION

According to the invention, the technical problem is solved as follows:

(a) The locking device is of the type which uses an ignition key having two identical and oppositely positioned notched profiles. Said key is provided, on the side of each notched profile, with a plane surface substantially perpendicular to the plane of the key and extending longitudinally beneath the corresponding notched profile.

(b) The spring-loaded feeler of the rocking lever rests on the exterior surface of a small plate radially sliding in a groove of the locking cylinder, from a retracted position in which it projects into the key slot, to an exterior or extracted position into which it is pushed when the key is inserted into the locking device.

(c) The interior side of the small plate is provided with a guiding surface which, in the extracted position of said plate, rests on the one of the two above-mentioned plane surfaces substantially perpendicular to the plane of the key, which, when the key is inserted, is adjacent to the notched profile nearest to the rocking lever.

BRIEF DESCRIPTION OF THE DRAWINGS

Other characteristics and advantages of the invention will be more fully understood when reading the following portions of the specification in conjunction with the accompanying drawings wherein:

FIG. 1 is a partial axial sectional view of the antitheft device according to the invention, before the insertion of the ignition key;

FIG. 2 is a transverse sectional view along line II—II of FIG. 1;

FIG. 3 is a top view, at an enlarged scale, of a part of FIG. 2;

DESCRIPTION OF THE PREFERRED EMBODIMENT

Figure 4:
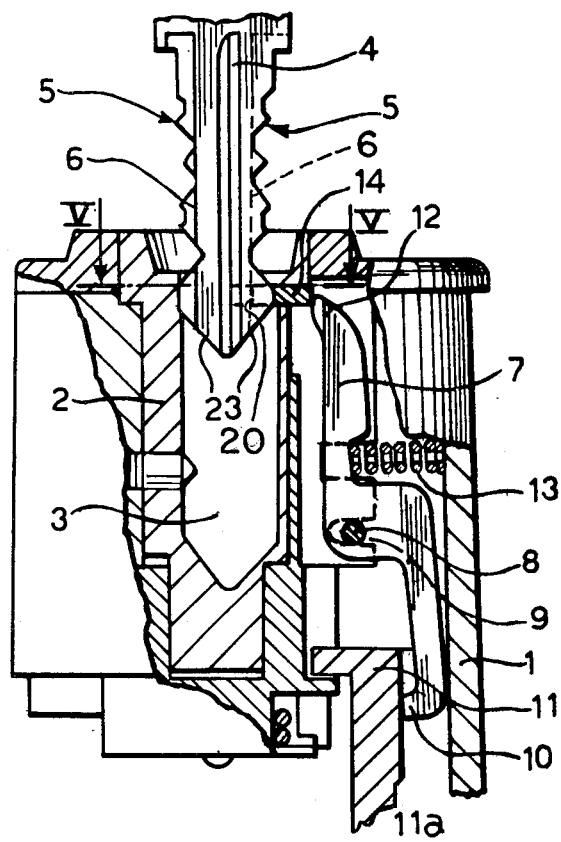
FIG. 4 is a partial axial sectional view of the antitheft device according to the invention, at the moment when the ignition key is being inserted.

The reference numeral 1 shows the stationary housing of an antitheft device comprising a rotatable locking cylinder 2 provided with a slot 3 for the key 4, said key 4 being of the reversible type and, therefore, provided with two identical and opposite notched profiles 5. On the side of each notched profile 5, the key 4 is provided with a plane surface 6 substantially perpendicular to the plane of the key 4 and extending longitudinally beneath the respective notched profiles 5.

In the housing 1, a rocking lever 7 may rotate around a central pivot pin 8, which pin 8 may slide, in a known manner, in a recess 9 of said rocking lever 7. One of the end portions of the lever 7 is provided with a projection 10 which rests on the latch 11 when said latch 11 is in the steering column locking position as shown in FIG. 1. The latch 11 is spring-loaded (not shown) in such a way that the spring urges said latch 11 into the steering column locking position.

When the vehicle is in the running condition, the latch 11 is in its retracted position and the projection 10 of one of the end portions of the lever 7 acts, in a known manner, as a stop since it is engaged in a recess 11a (FIG. 4) of said latch 11. The other end portion of the lever 7 acts as a finger or feeler 12 detecting the presence of the key 4 in the slot 3 of the locking cylinder 2. The reference numeral 13 shows a drawback spring acting on the lever 7 in such a way that said finger or feeler 12 is urged towards the slot 3 of the locking cylinder 2.

The reference numeral 14 shows a small U-shaped plate radially slidable in a groove of the locking cylinder 2, near the upper end portion of said cylinder. As shown in FIG. 3, the small plate 14 has two legs 15,17 of different lengths. The longer leg 15 is guided in a portion 16 of the groove, located on one side of the key slot 3, while the shorter leg 17 is guided in a portion 18 of the groove, located on the other side of the key slot 3.

In FIGS. 1 and 2, the key 4 has not yet been inserted into the slot 3 and the small sliding plate 14 is in its retracted position because of the pressure exerted on its external surface 19 by the finger 12 of the spring-loaded lever 7. The external surface 19 of said small plate 14 has a cylindrical profile having the same curvature as the exterior surface of the locking cylinder 2, as may best be seen in FIG. 2.

In said retracted position, the internal surface 15a of the leg 15 is in contact with a rear surface of the portion 16 of the groove in the locking cylinder 2 and the internal surface 20 of the leg 17 is in contact with a rear surface of the portion 18 of said groove.

The interior surface 21 of the shorter leg 17 of the small sliding plate 14 is inclined towards the interior of said leg 15 and the edge between the interior surface 21 and the internal surface 20 is rounded as shown by reference numeral 22.

INDUSTRIAL APPLICABILITY

When the key 4 is inserted into the slot 3, one of the inclined surfaces 23 of said key acts like a cam on the free surface 20 of the shorter leg 17 of the small plate 14 and pushes said plate 14 radially towards the exterior housing 1 of the antitheft. When the key 4 is fully inserted in slot 3 and is rotated with the lock cylinder 2, the latch 11 is moved axially by a cam, not shown, toward the lock cylinder 2 until the projection or stop 10 on the lever 7, which is urged by spring 13, snaps into the recess 11a to hold the latch 11 retracted.

Figure 5:
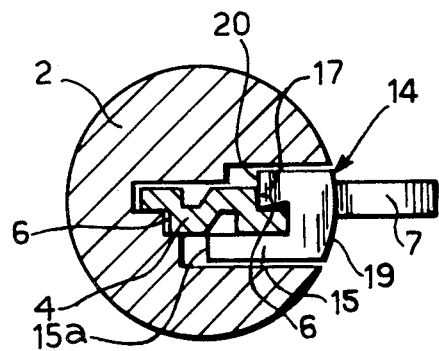
FIG. 5 is a transverse sectional view along line V—V of FIG. 4.

As shown in FIGS. 4 and 5, when the small plate 14 is at the end of its radial movement towards the housing 1, the surface 20 of the leg 17 of said plate 14 rests on the surface 6 of the key 4 which is adjacent to the notched profile nearest to the lever 7. Consequently, when the key 4 is axially moved in the slot 3, the surface 20 of the small plate 14 slides along the surface 6, said surface 6 thus having the same function as the plane back surface of the key 4 in the known antitheft devices. The invention therefore provides an antitheft device which prevents any accidental displacement of the latch 11 into its steering column locking position, just as the known antitheft devices which are actuated by a key with a single notched profile, i.e. by non-reversible keys.

It will be understood that the present invention is not limited to the exact construction shown and described, but that various changes and/or modifications may be made without departing from the spirit and scope of the invention as defined in the appended claims.

I claim:

1. An antitheft device of the type that includes a latch which is resiliently urged into locking relationship with the steering column of an associated motor vehicle and a rocking lever having, at each of its ends, a projection directed towards the interior of the antitheft device, one of the projections being a lock which is engagable to retain the latch in its unlocked position, and the other acting as a finger which is operable to sense the presence of an ignition key in the key slot of an associated locking device, characterized in that:

(a) the associated locking device comprises a rotatable locking cylinder (2) which has a groove within guide surfaces (16, 18) adjacent the finger (12) of the rocking lever (7) and a key slot (3), and is actuatable by a key (4) having two identical and opposed notched profiles (5) and a longitudinally extending plane surface (6) projecting laterally and substantially perpendicular to the plane of the key (4) at substantially the bottom of each notched profile (5), (b) the finger (12) of the rocking lever (7) rests on the exterior surface (19) of a small U-shaped plate (14) which has legs (15, 17) of different lengths, and is mounted in the groove within the guide surfaces (16, 18) in the rotatable cylinder (2) for radial sliding movement from a retracted position wherein an interior portion of the shorter leg (17) of said plate (14) projects into the key slot (3) to an extended position wherein the exterior surface (19) of said plate (14) urges the rocking lever (7) into a position where the lock (10) thereof is operable to retain the latch in its unlocked position, the rocking lever (7) being operable to urge said plate (14) towards its retracted position, and (c) the shorter leg (17) of said plate (14) has a guiding surface (20) which, when the key (4) is inserted in the key slot (3), rests on the one of the plane surfaces (6) of the key (4) which is nearer the rocking lever (7), and is driven thereby to slide said plate (14) to its extended position, while said longer leg (15) is guided in the groove by one of the guide surfaces (16, 18).

2. A device according to claim 1 characterized in that the interior surface (21) of the shorter leg (17) of the U-shaped plate (14) is inclined towards the longer leg (15).

3. A device according to claims 1 or 2, characterized in that the small plate (14) is rounded at the edge (22) between the guiding surface (20) and the interior surface of the shorter leg (17).

* * * * *